United States Patent [19]
Clark et al.

[11] Patent Number: 5,670,070
[45] Date of Patent: Sep. 23, 1997

[54] METHOD AND SYSTEM FOR CONTROLLING THE OUTPUT OF AN ENGINE DRIVEN WELDER

[75] Inventors: Keith Leon Clark, Concord; Denis Michael Osowski, Parma; Scott Joseph Schraff, Lakewood, all of Ohio

[73] Assignee: The Lincoln Electric Company

[21] Appl. No.: 522,454

[22] Filed: Aug. 31, 1995

[51] Int. Cl.$^6$ ............................................. B23K 9/095
[52] U.S. Cl. ............................ 219/130.33; 219/133
[58] Field of Search ................ 219/137 PS, 130.33, 219/133, 134

[56] References Cited

U.S. PATENT DOCUMENTS

| | | | |
|---|---|---|---|
| 3,549,979 | 12/1970 | Stearns et al. | 219/130.33 |
| 3,912,980 | 10/1975 | Crump et al. | 219/130.33 |
| 4,608,482 | 8/1986 | Cox et al. | 219/137 PS |
| 5,408,067 | 4/1995 | Crouse | 219/137 PS |
| 5,444,214 | 8/1995 | Crouse et al. | 219/133 |

*Primary Examiner*—Clifford C. Shaw
*Attorney, Agent, or Firm*—Vickers, Daniels & Young

[57] ABSTRACT

A method and system of controlling the output current/voltage characteristic curve of an engine driven alternator welder with a maximum open circuit output voltage, including a rotary engine, a three phase alternator, a rectifier bridge having a number of electronic switching devices for directing current to the output at an operating point determined by the firing angle of the switching devices, a sensor for sensing output current, a sensor for sensing output voltage, and a microprocessor output control device for controlling the firing angles of said switching devices in response to the sensed current and sensed voltage. The method and system comprise a device for creating a desired fixed slope operating current/voltage characteristic curve; an arrangement for sensing the present operating current/voltage point of the welder; and, a control for changing the firing angles of the switching devices to shift the current operating point to a new operating point on the desired, fixed slope current/voltage curve of the welder. Preferably, the switching devices include an SCR for each phase of the alternator.

14 Claims, 7 Drawing Sheets

| MODE | K1 | K2 | C1 | C2 | V<sub>MIN</sub> |
|---|---|---|---|---|---|
| 1 | a | g | m | n | o |
| 2 | b | h | m | n | p |
| 3 | c | i | m | n | q |
| 4 | d | j | m | n | r |
| 5 | e | k | m | n | s |
| 6 | f | l | m | n | t |

POINT A     POINT B
LINE = $(i_{no}, V_{no})$ AND $(0, \frac{V_{no}}{KI})$

METHOD AND SYSTEM FOR CONTROLLING THE OUTPUT OF AN ENGINE DRIVEN WELDER

The present invention relates to the art of electric arc welding and more particularly to a method and system for controlling the current/voltage characteristic curve of the output of an engine driven alternator welder.

INCORPORATION BY REFERENCE

Letters U.S. Pat. No. 5,408,067 is incorporated by reference herein to illustrate an engine driven alternator welder of the type to which the present invention is directed. The welder includes a three phase alternator and an output rectifier wherein the current directed to the welding operation is controlled by adjusting the firing times or firing angles of the SCRs in the rectifier. Details of this type of welder are well known in the art and are shown in the above mentioned patent; therefore, they are not repeated, except as necessary background.

BACKGROUND OF INVENTION

One of the more common DC welders is an engine driven welder of the type including a rotary engine, a three phase alternator, a rectifier bridge having a number of electronic switching means, such as SCRs, for directing current to the output of the welder wherein the current is determined by the firing angle of the respective switching means during each appropriate, positive half cycle of each phase in the rectifier. Such welders normally include means for sensing either the output current or the output voltage. In some instances, both the output current and the output voltage are sensed and are used to control the welding current of the welder. Even though welders of this type have become quite common, they have a somewhat limited application for out of position welding, such as pipe welding wherein heat is controlled by arc current. In such welding processes, DC generators are preferred for their smooth arc characteristics. These generators are quite bulky, expensive and normally require an external source of electrical power for excitation. Consequently, the limited versatility of DC generators, together with their cost and bulkiness, have reduced the desirability of these generators in various out of position welding operations, such as pipe welding, which is an active field requiring large amounts of consumables each year. It is desirable to have a low cost, dependable welder which can be used for out of position welding and which has the cost and size advantages of an engine driven alternator welder, such as described in U.S. Pat. No. 5,408,067. However, alternator welders without large reactor elements have a relatively flat current/voltage characteristic static curve and do not approximate the output characteristics of the DC generator. Thus, users in the field must select between the smoother output of a DC generator and the smaller size and lower cost of an alternator welder. In order to satisfy the desires of a full line of welders, manufacturers of welding power supplies have chosen to offer both D.C. generators and alternator-based topologies for engine driven welders.

THE INVENTION

The present invention relates to a method and system for controlling the output of an engine driven alternator welder so that the current/voltage characteristic curve of the welder is a generally straight line with a fixed slope so that the engine driven alternator welder can be used in welding operations which heretofore have required DC generators.

In accordance with the present invention, a method and apparatus for controlling the output current/voltage characteristic curve of an engine driven alternator welder is provided. Such welders have a generally fixed, maximum open circuit output voltage. They also include a rotary engine, such as a gasoline engine, a three phase alternator and a rectifier bridge includes a number of electronic switching means for directing current to the output of the welder. The output current value or level is determined by the firing angle of the phase dedicated switching means or SCRs, which switching means are fired at controlled times in the positive half cycle to control the amount of output current. To change the current and thus the operating point on the characteristic curve, the firing angles, or firing times, of the SCRs are adjusted in response to the sensed current and/or sensed voltage. In accordance with the invention, the engine driven alternator welder is controlled by a microprocessor and has a manually manipulated mode select switch having a finite number of modes, each of which controls the fixed slope for the current/voltage characteristic curve used in a selected mode. To accomplish this objective, the mode select switch is shifted to a desired mode of operation. The selection of the mode is used to create first and second slope parameters. The set of parameters is dedicated to and indicative of a known, fixed slope for the current/voltage characteristic curve desired for the output of the engine driven alternator welder. The fixed slope is defined by the relationship of the first and second parameters used in implementing the manually selected mode of operation. The voltage of the welding operation, which is the arc voltage, is used to generate, periodically, a voltage value indicative of the real time sensed output voltage. This value of the voltage is combined with the first slope parameter to give a voltage slope coordinate. In a like manner, a current value indicative of the real time sensed output current is generated and combined with the second slope parameter selected by the mode select switch to give a current slope coordinate. The two slope coordinates are added together to create what is known as a "regulation term" or value indicative of the present operating point of the welder output along the current/voltage characteristic curve, which operating point is to be used by the present invention. The operating point is on a straight line with a fixed slope and includes a voltage and a current. The regulation term defines the line of the operation point when taken with the slope of the line. A desired set point is then created for comparison to the generated regulation term to determine the deviation of the regulation term from a target line which is a characteristic curve which is parallel to the line determined by the first and second parameters and the maximum open circuit value. This maximum value in practice is fixed at the maximum output of the welder; however, it could be an adjusted position to intersect the y axis (I=0) at a voltage less than the actual maximum voltage of the welder. The set point is on a target line with a fixed slope and a selected y intersect voltage. The set point is manually selected to give an open circuit voltage less than the actual maximum open circuit voltage, or selected maximum voltage, of the engine driven alternator welder. By comparing the desired set point with the regulation term as created by the present voltage and the present current (the operating point) in accordance with the invention, an error signal is developed. This error signal is used to change the firing angles of the switching means, or SCRs, in response to the magnitude of the error signal during each sampling stage of the master program of the microprocessor. In accordance with another aspect of the invention, gain controls are employed wherein the magnitude of the error signal is increased by the difference between the stationary set point value and the dynamic regulation term. In addition, the difference between the present regulation term and the next prior regulation term may be used as a second gain factor for the corrective impact of the detected error. By employing these concepts, the firing angles of the SCRs are controlled to force the output characteristic of the engine driven alternator welder to move along a preselected fixed slope like a DC generator. Correction from sample time to sample time, which may be several times per second, can be modulated by appropriate gain factors for the error signal.

In the characteristic curve of the present invention, the voltage and current are controlled as a fixed straight line. The line is determined by a selected slope and a desired value indicative of the y intercept. The slope is determined by the adjustment of the mode control switch. The y intercept of the target line is determined by the mode control switch and a fine potentiometer. The line defining the output characteristic is the product of the slope and the current with the y or voltage intercept being the parameter monitored and controlled by the present invention. The y intercept or open circuit voltage intercept is periodically compared to a set point which also corresponds to the y intercept or open voltage intercept of the characteristic curve. A fine adjustment potentiometer shifts the actual fixed curve to be followed by the control arrangement of the present invention between a maximum and minimum open circuit voltage value. By using the present invention, this control of an engine driven alternator welder is possible so that the engine driven alternator welder has a fixed output characteristic curve similar to a DC generator welder. The parameters controlling the regulation term are shown by the following equation:

$$V_{out}=(K1)V_{arc}+(K2)I_{arc}$$

This is a line equation as follows:

$$V_{arc}=-\left(\frac{K2}{K1}\right)I_{arc}+\left(\frac{1}{K1}\right)V_{OUT}$$

In reference to FIG. 3, the equation can be changed as:

$$V=-\left(\frac{K2}{K1}\right)I+\frac{V_{OUT}}{K1}$$

Wherein:

V is the y value

I is the x value $$\frac{K2}{K1}$$

is the slope $$\frac{V_{OUT}}{K1}$$

is the y intercept

The regulation term $V_{OUT}$ is equal to the nominal operating point at any given term, which point has a voltage and current coordinate on a fixed line where the y intercept is $V_{OUT}/K1$ or the nominal voltage divided by K1.

The objective of the method and system for controlling the output along a selected line is to create the regulation term $V_{OUT}$ and controlling current and voltage to force $V_{OUT}$ to the set point $V_{SP}$ by adjusting the firing angles or times of the SCRs of rectifier 30. The set point is the fixed y intercept divided by K1 to define a line.

In accordance with the invention, as described above, there is created a real time value or signal, which signal is the summation of two constantly changing signals, one signal being the average arc voltage at any given time multiplied by a constant (K1) and the other is the average arc current in any given time multiplied by another constant (K2). The ratio of the two constants (K1, K2) is the slope of the characteristic curve wherein the ordinate is voltage and the abscissa is current. The relationship wherein the signal is determined by the summation of a voltage term and a current term is a line with the average voltage being equal to the slope of the line multiplied by the average current and the y, or ordinate, intercept is the regulation term, value, or signal $V_{OUT}$ divided by K1, one of the slope constants. This signal is the instantaneous output of the engine driven, microprocessor controlled alternator type welder as the operator selects the operating point on a given load line. If the operating point is not along this target line, the firing angles of the SCR switching means are modified to force the output of the welder to the desired line from the deviated, instantaneous operating point. In accordance with the invention, a set point SP is created which is a fixed value for each selected mode of operation. The set point SP is equivalent to the regulation term, value or signal $V_{OUT}$. The set point is held constant so that the control system or method changes the voltage and current output of the welder to bring the regulation term $V_{OUT}$ to the preset set point. The set point value is controlled by the mode select switch that selects the desired slope and the desired open circuit minimum voltage to create the target line. The difference between the selected open circuit voltage and the actual open circuit maximum voltage, or selected maximum voltage, gives the operating range for a given selected mode. The set point is then adjusted vertically to give the exact position of the target line having a slope determined by K1, K2 but an open circuit voltage, or y intercept, between the selected maximum voltage and the selected minimum voltage for a given mode. The target line is parallel to the line previously described with offset in a vertical direction determined by the manual adjustment of a fine potentiometer, which provides trimming of the line to be tracked, so that the line being followed when the control system forces the regulation term toward the set point is a parallel line with a voltage or y intercept between the actual or selected maximum open circuit voltage of the welder and the selected minimum open circuit voltage determined by the mode select switch. As the mode select switch varies fixed slopes in a mode, the minimum voltage of the y intercept can be adjusted. It is not necessary that this minimum value be adjusted. The maximum voltage intercept is normally a constant; however, it can be changed if desired when a mode is selected. By using this control scheme, the output of the engine driven welder is forced to follow a preselected straight line characteristic curve, as opposed to the standard characteristic static curve of an engine driven alternator welder.

The microprocessor or microcontroller employs, in the preferred embodiment of the invention, software which implements the method and system of the present invention. This invention could be practiced by hardwired circuitry, as illustrated in the present application, by software or by other implementation of the method and system. The invention involves a combination of arc current and arc voltage control and produces a slope output that effectively mimics the static output characteristics of the DC generator. Only the static aspects of the method and system has so far been described.

In accordance with another aspect of the present invention, the system or method is provided with a dynamic control, such as often used as a PID control scheme wherein a gain is selected based upon proportion, a gain is selected based upon a difference and a gain is selected based upon an integration. In the preferred embodiment of the present invention the only gain control, in a dynamic sense, is based upon the proportion of an error signal and the difference of the existing regulation term to the next prior regulation term.

The slope control is incorporated, in the preferred embodiment, in the main operating software program of the welder, which welder is totally controlled by a microprocessor. The software program resides in the non-volatile EPROM of a Motorolla HC 11E9 microcontroller, which controller is the heart of the Mother Control PC board. The welding operating program, in accordance with the preferred embodiment of the invention, has a main loop which executes or cycles every 30 ms. The main control loop for the welder performs a large number of background functions including reading the position of user inputs which determine the set point of the present invention. The manually adjusted inputs used by the present invention are the mode select switch, the fine potentiometer adjustment switch. The main welder control loop is interrupted eighteen times per 60 Hz line cycle in order to run the sample interrupts in which the arc voltage and the arc current are measured and used with the manually selected current set point SP in order to calculate the proper conduction angle of the rectifier switching means, such as the SCRs. The slope control aspect of the present invention is contained within the sample interrupt of the main program used in operating the welder but is executed only when the user has selected one of six available slope modes using a seven position mode select switch on the front panel of the welder. In accordance with the method and apparatus of the present invention, the sensed value of the arc current and the sensed value of the arc voltage are combined with constants K1, K2, which are preprogrammed in the EPROM to determine the value of the output slope that the welder will maintain as a static characteristic line. The constants (K1, K2) employed in selecting the slope are preprogrammed and then selected from a table depending upon the position of the manually operated, mode select switch. The slope of the static characteristic line is equal to the quotient of K2/K1. The present or real time voltage is determined by sampling the arc voltage a number of times, in practice, sixteen times, and the real time present current is sampled once. These operations occur during the sampling interrupt of the main operating program for the welder. The regulation term, value or signal $V_{OUT}$ created in this manner is the term that is compared with the manually selected set point SP which, together with the slope, defines the line to be tracked during the operation of the welder. The set point SP is derived from the position of the mode select switch in combination with a fine control potentiometer or select switch. The fine control potentiometer has a large number of settings, in practice 256 settings. This adjusts the vertical position of the line followed by the set point. The set point is the summation of a selected minimum open circuit voltage and a multiple value determined by the selected position of the fine control potentiometer and the difference between the maximum and minimum open circuit voltage determined by the main mode select switch. The position of the fine control potentiometer creates a value which is employed for adjusting the vertical position of the fixed slope characteristic curve determined by the ratio K2/K1 of the constants (K1, K2) selected by the mode select switch. Maximum output voltage is an inherent limit of the engine driven alternator welder. The invention uses a maximum voltage value, which may be the welder on a selected maximum voltage. The minimum voltage employed in accordance with the method and system of the present invention is a preprogrammed value for the open circuit voltage of the welder, which is selected from a table dependent upon the position of the main mode control switch. In this manner, the set point SP is a line parallel to the fixed line determined by $V_{OUT}$, but located at one of 256 locations between the maximum open circuit voltage and the minimum open circuit voltage of the engine driven welder.

During normal operation, the sampling interrupt compares the set point SP to the regulation term $V_{OUT}$ and uses the difference between these signals to generate an error signal. In accordance with an aspect of the invention, the set point SP and the regulation term $V_{OUT}$ are combined with dynamic gain signals C1, C2, which in the illustrated embodiment of the present invention are fixed constants for all selected modes. The error signal is rated not only by the difference in the set point SP and the regulation term $V_{OUT}$, but also by the difference between the present regulation term $V_{OUT}$ and the previous regulation term $V_{OUTP}$. In this manner, the proportional gain C1 and a differential gain C2 can be incorporated into the error signal before this error signal is used to adjust the firing angles of the SCRs to bring the operating point (voltage and current) selected by the user to a voltage/current point on the straight line followed by use of the present invention. As the user changes the load line of the welding operation, the operating point, identified by the present voltage and current, changes as the user performs the welding process. This change in the operating point tends to be along the normal characteristic curve of the engine driven alternator welder. In accordance with the present invention, the method and system forces the new operating point to follow a preselected fixed slope, so that the effective output characteristic curve, in essence, tracks along a fixed slope characteristic curve similar to a DC generator.

The primary object of the present invention is the provision of a method and system for changing the output characteristic of an engine driven, microprocessor controlled welder of the type employing an alternator and an SCR controlled output rectifier.

Another primary object of the present invention is the provision of a method and system, as defined above, which method and system can force the output characteristic curve of the microprocessor controlled engine driven welder to approximate the output characteristic curve of a DC generator.

Yet another object of the present invention is the provision of a method and system, as defined above, which method and system can be incorporated into any microprocessor controlled engine driven welder with minor changes in the overall control system or method.

Another object of the present invention is the provision of a method and system, as defined above, which method and system employs a very small area of the read only memory in a microprocessor controlled, engine driven DC welder.

Another object of the present invention is the method and system, as defined above, which method and system is relatively inexpensive, easy to implement and allows use of engine driven alternator welders for out of position welding in the field, with the advantages of an engine driven alternator welder and the advantages of a DC generator.

These and other objects and advantages will become apparent from the following description.

BRIEF DESCRIPTION OF DRAWINGS

To illustrate the preferred embodiment of the present invention, the following drawings are employed.

PREFERRED EMBODIMENT

Figure 1:
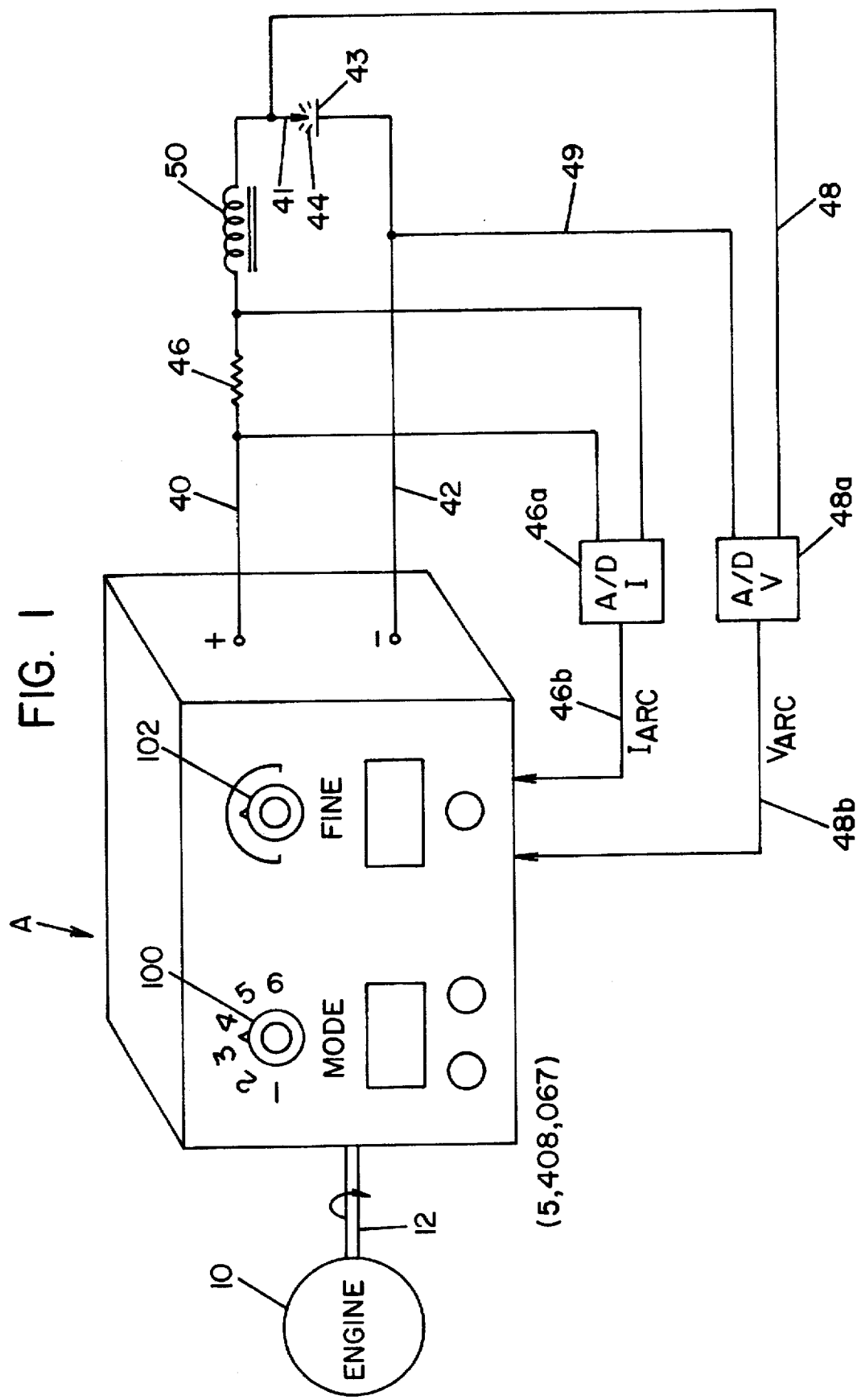
FIG. 1 is a generally pictorial view showing an engine driven welder of the type incorporating the method and system of the preferred embodiment of the present invention.
Figure 2:
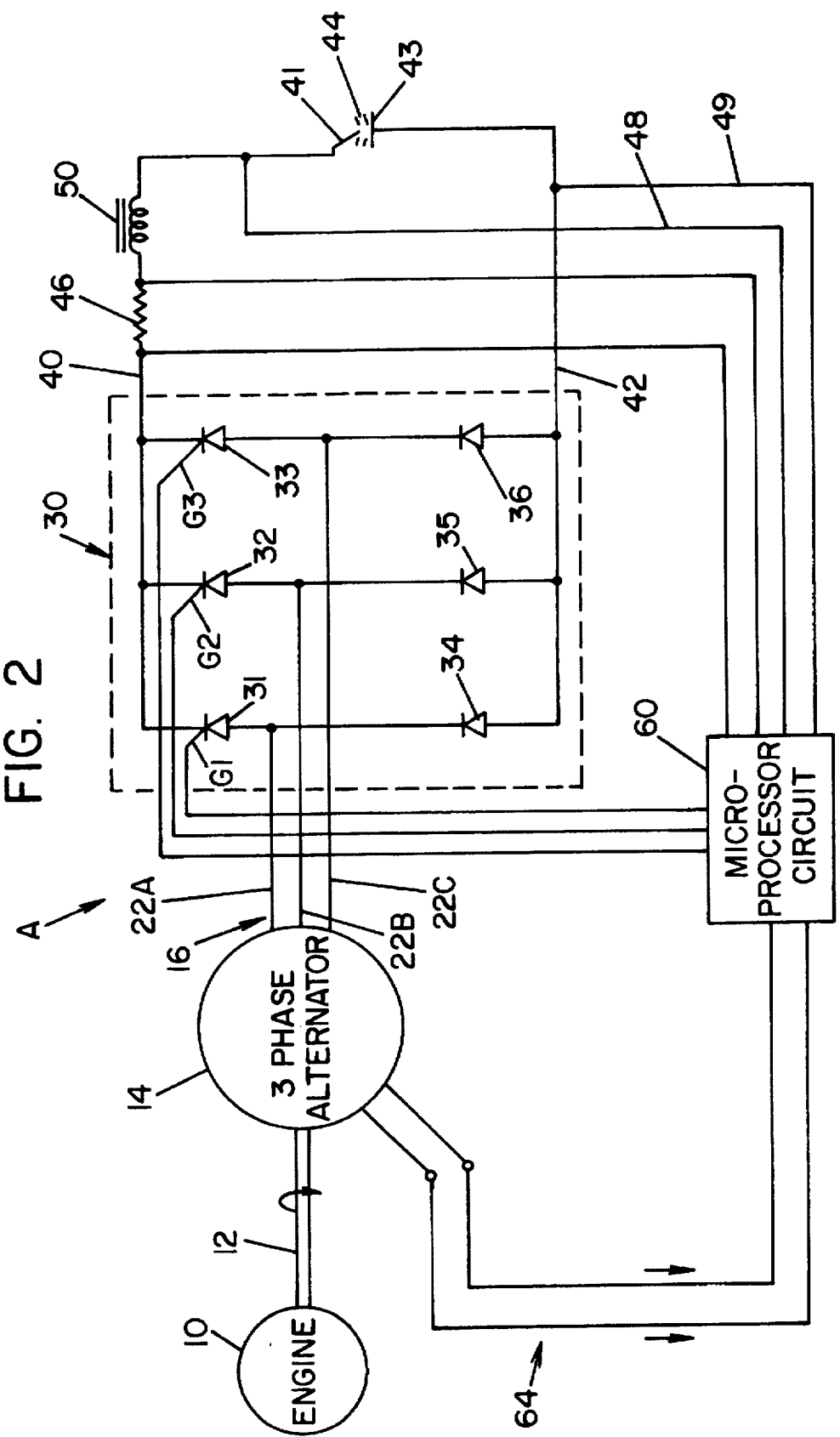
FIG. 2 is a schematic wiring diagram of an engine driven welder as shown in Letters U.S. Pat. No. 5,408,067 and the type of welder used in the method and system of the present invention.

Referring now to the drawings, wherein the showings are for the purpose of illustrating the preferred embodiment of the present invention only, and not for the purpose of limiting same, FIGS. 1 and 2 illustrate an engine driven DC welder A of the type driven by a rotary engine 10, such as a gasoline engine including a driveshaft 12 for rotating a standard three phase alternator 14. The three phase output 16 of alternator 14 directs current through lines 22A, 22B, and 22C to rectifier 30 of standard construction. This three phase rectifier includes SCRs 31, 32 and 33 having appropriate gates G1, G2, and G3, respectively. A pulse in these gates during the positive half cycle applied across the SCR of the particular phase, fires or renders conductive the SCR to pass the current through the SCR toward the output 40. Diodes 34, 35 and 36 for the three phase network of rectifier 30 are connected to output lead 42. DC current created between output leads 40, 42 of rectifier 30 is directed to the welding station, represented as electrode 41, workpiece 43 and arc 44. In accordance with standard practice, the arc current is detected by shunt 46 and is directed toward an appropriate analog to digital converter 46a to create an output signal in line 46b, which signal is representative of the instantaneous, sensed arc current at the welding operation. In a like manner, voltage is detected by lines 48, 49, which lines are directed to an analog to digital converter 48a so the output 48b of converter 48a is the instantaneous or sensed arc voltage of the welding operation. A standard choke 50 is used in the welding circuit for well known reasons. As illustrated in FIG. 2, the sensed current and sensed voltage is directed to the microprocessor circuit 60 located inside the housing of welder A, as shown in FIG. 1. The microprocessor is a standard digital processor control circuit having appropriate memory cards and hardwired circuitry for analog inputs, such as the lines to control circuit 60, as shown in FIG. 2. The voltage and current is controlled by the length of the arc and other parameters at the welding operation. As shown in FIG. 2, three phase alternator 14 has appropriate synchronizing lines 64 for controlling the microprocessor control 60. In accordance with the preferred embodiment of the invention, the synchronizing signal or pulse in lines 64 is developed from the exciter winding and is used to synchronize the firing positions of the SCRs. This synchronization feature is known technology illustrated in U.S. Pat. No. 5,408,067.

Figure 3:
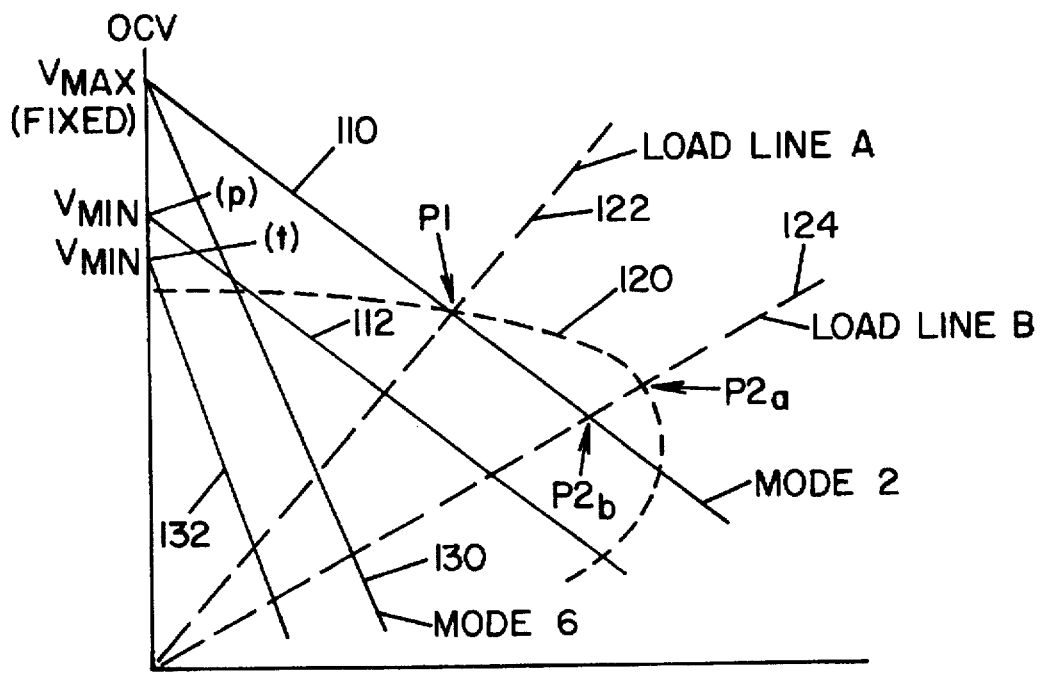
FIG. 3 is a graph showing characteristic curve obtained by use of the preferred embodiment of the system and method of the present invention.
Figure 4:
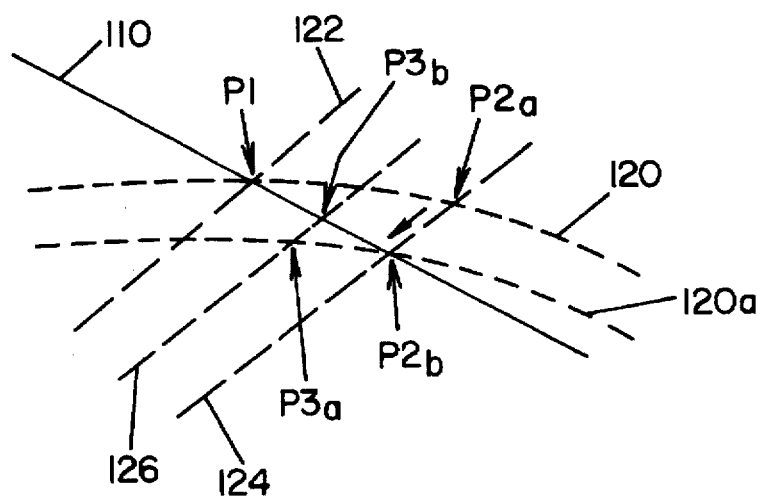
FIG. 4 is an enlarged view of an area illustrated in the graph of FIG. 3 which is used to explain the operating features of the method and system constituting the preferred embodiment of the present invention.
Figures 5, 6:
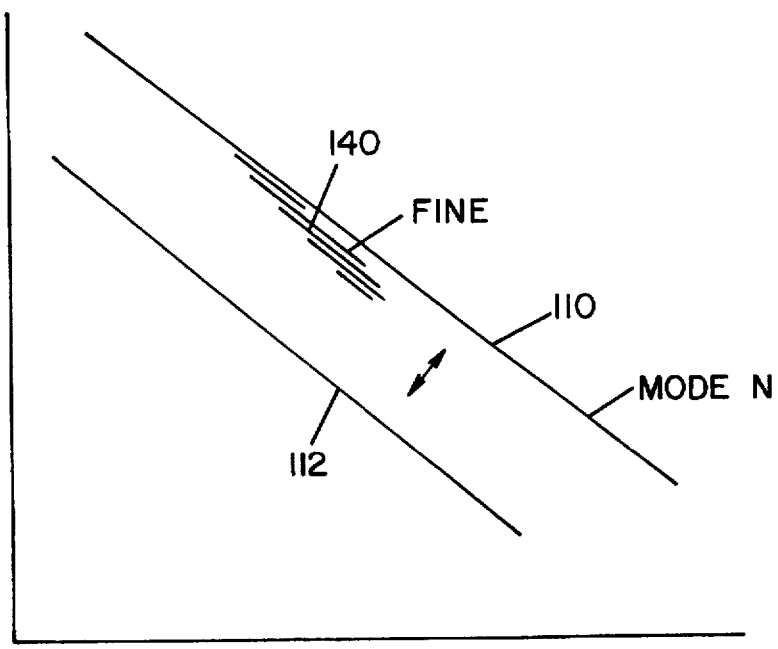
FIG. 5 is a graph similar to the graph illustrated in FIG. 3 showing the operation of the fine adjustment potentiometer of the preferred embodiment of the present invention.
FIG. 6 is a table of the type permanently contained in the EPROM of the microprocessor for the engine driven welder and illustrating the parameters for the various modes selected in accordance with the preferred embodiment of the present invention.

In accordance with the present invention, welder A has a mode select switch 100 rotatable between modes 1-6 and a fine control potentiometer 102 for creating 256 different vertical settings of the target line. In FIGS. 3-5, when switch 100 is turned to a given position, illustrated as MODE 2, the output characteristic curve of the present invention is along a straight line 110 with the y intercept being the maximum open circuit voltage of welder A. The particular setting of switch 100 determines the slope of line 110, which slope is negative from the maximum open circuit voltage to a reduced voltage as the current increases. The slope and y intercept of line 110 defines the line. In accordance with another aspect of the present invention, the fixed slope of line 110 can be shifted vertically downward toward line 112 by manual adjustment of the fine control potentiometer 102. This is shown best in FIG. 5. The fine control potentiometer shifts the actual selected operating curve for welder A vertically downward to a line 140. There are 256 adjustments to give a lower line 140. The mode switch selects the slope (K2/K1) of a line with the y intercept being the open circuit voltage of the particular line chosen and potentiometer 102 shifts the line vertically to the desired operating level. The particular adjustments of switch 100 and pot 102 determine the actual operating output characteristic curve created by use of the present invention.

To illustrate the advantage of the present invention and the functions of the present invention, it is assumed that the selected line 140 is line 110 as shown in FIGS. 3-5. The normal operating characteristic curve for an engine driven self-exciting alternator welder of the type to which the present invention is directed is shown as line 120. After the operator or user has adjusted the desired current and starts welding, the welding point in respect to current and voltage on line 110 is illustrated as welding operating point P1. This is on the load line A. As the user operates along line A, changes such as increased arc length and other variable of the welding operation will cause a shift in the load line A toward a new load line B and operating point $P2_a$. This is best shown in FIG. 4. By using the present invention, the firing angles of the SCRs 31, 32 and 33 are adjusted several times each second to drive or force the operating point $P2_a$ from the natural characteristic curve 120 toward the fixed output line labeled 110. Line 110 is the desired characteristic output of the DC welder and corresponds to the output characteristic of a somewhat standard DC generator. While operating in the new point P2$_b$, the new standard characteristic curve of the alternator 120a is applicable. Assume now that the operator shifts back to an operating load line 126, as shown in FIG. 4, a new operating point P3$_a$ is sought by the DC welder. However, the operating point should be P3$_b$. In accordance with the invention, the operating point is forced from P3$_a$ to P3$_b$ so that the characteristic curve 110 is maintained. The invention is an engine driven alternator welder controlled by a microprocessor control. Output slope controls of various types are known in the field, but none of these controls are employed for accomplishing the objectives of the present invention, which is a method of controlling the output of a specific DC welder.

Figure 10:
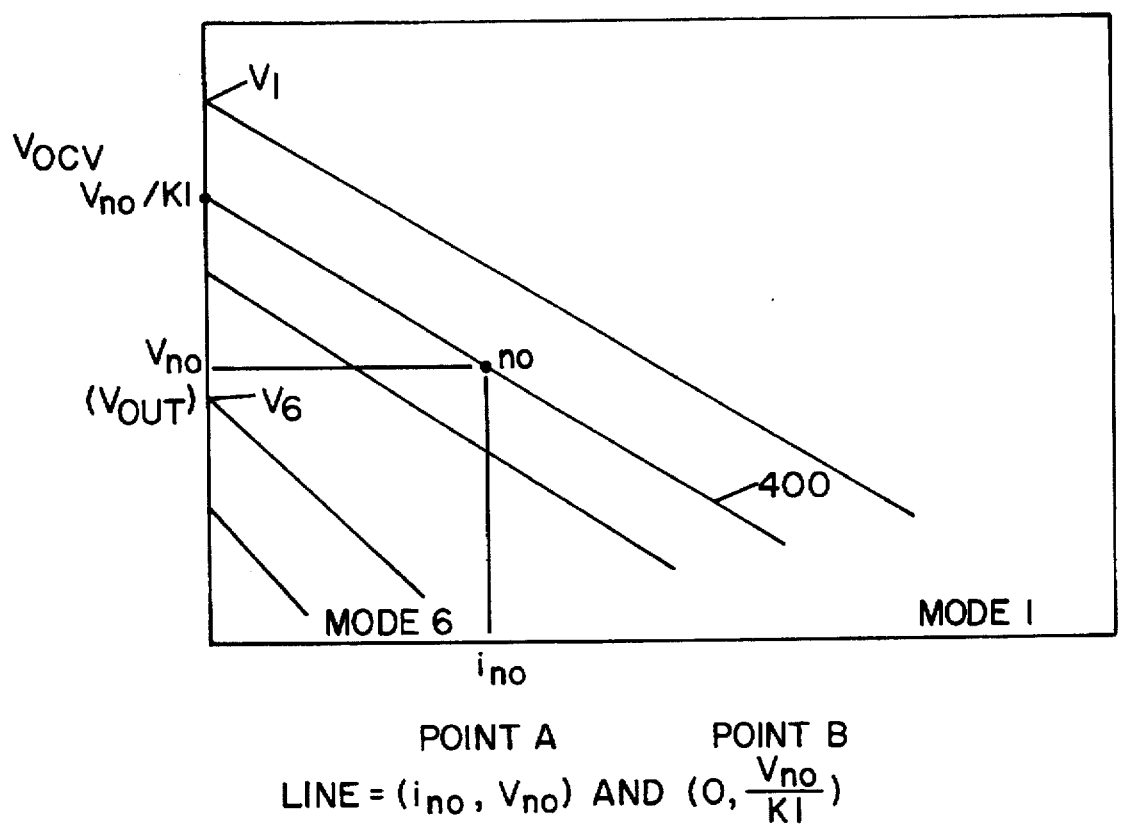

In accordance with the illustrated embodiment of the present invention, a "look up" table 160 is used in conjunction with the mode select switch or dial 100. This table, as use in the illustrated embodiment, is permanently stored in the EPROM of the microprocessor and is illustrated in FIG. 6. Table 160 includes mode select stations 1–6 in area 100a. The slope determining constant K1 has a preselected value a–f according to the particular selected mode, such as MODE 1–MODE 6. This area of the EPROM is labeled 160a. The area 160b contains the second slope determining constant K2, which has a value between g–l. In accordance with the invention, when switch 100 is rotated to MODE 1, a pointer is indexed to the top of area 100a. Constant K1 has a value a and constant K2 has a value g. These two constants control the static aspect of the present invention. The other static characteristics is the minimum voltage. As shown in FIG. 3, the minimum voltage is the adjusted lower position along the y coordinate. In table 160, minimum voltage p is used for MODE 2. Minimum voltage t is used for MODE 6. MODE 6 thus has operating limits represented by two parallel lines 130, 132, as shown in FIG. 3. MODE 2 has operating limits represented by two parallel lines 110, 112. The minimum open circuit voltage is varied according to the selected mode. This causes a different range of operation as the fixed slope of the characteristic curve is changed. Table 160 includes dynamic gain factors C1, C2. These values are for proportional and differential dynamic control of the generated error signal. Although these gain values C1, C2 can be changed, in practice they have the fixed values m, n, respectively. As desired, these dynamic gain control values could be changed according to the selected mode. In practice the maximum voltage is the same for all modes; therefore, there are no values in table 160. As a modification, as shown in FIG. 10, the maximum voltage can be selected by switch 100 and values of this parameter would be in table 160.

Figure 7:
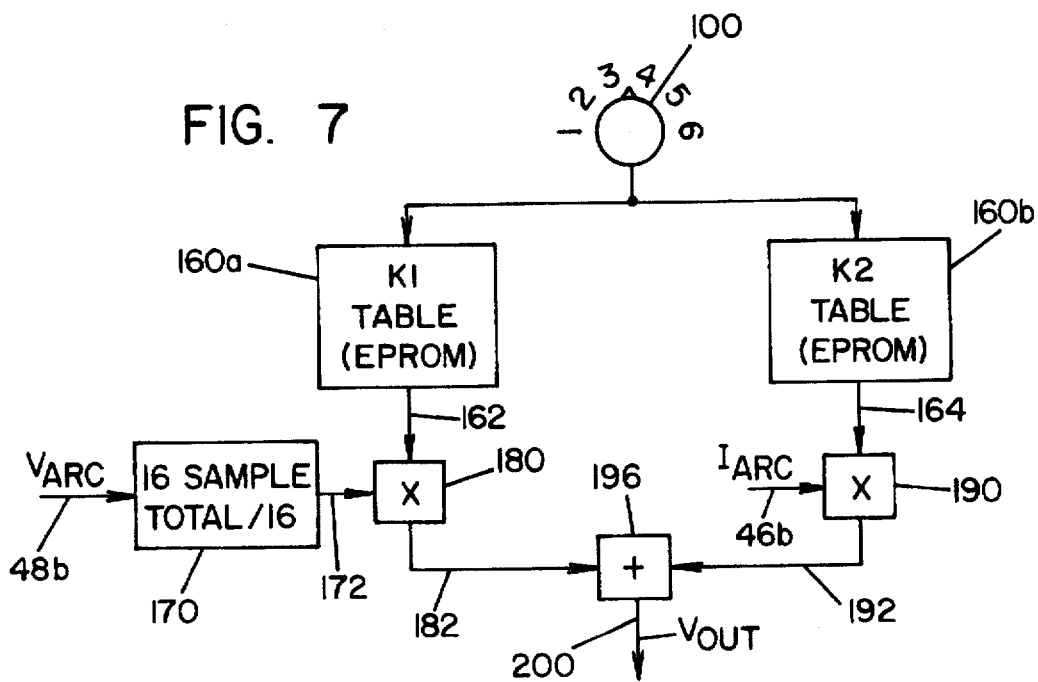
FIG. 7 is a block diagram illustrating the development of the regulation term, value or signal $V_{OUT}$ in accordance with the preferred embodiment of the present invention.

The first aspect of the preferred embodiment of the present invention is a system and method for selecting the regulation term, the value or signal V$_{OUT}$ which signal is indicative of the present operating point along a desired fixed slope output curve, like lines 140. This output signal or regulation term V$_{OUT}$ defines a static line with a slope controlled by constants K1, K2. The signal V$_{OUT}$ divided by constant K1 is essentially the y intercept of the line in which the welder is being operated. The circuit for obtaining this regulation value, or signal V$_{OUT}$ is illustrated in FIG. 7 wherein mode select switch 100 indexes table 160 to produce a desired output constant from areas 160a, 160b, which constants K1, K2 are indicative of the selected mode of operation. The selected mode determines the fixed slope of the output characteristic to be followed by the welder, which slope constants are represented by the values in areas 160a, 160b of table 160. The output from table 160 is directed to line 162 and contains one of the values of K1 shown in FIG. 6. The level of the arc voltage appearing in line 48b is directed to the input of a sample circuit 170, which circuit will sample 16 successive values of the arc voltage in line 48b, total the values and divide by 16. This process can also be an integrator circuit. Circuit 170 produces a real time voltage signal in line 172, which signal is directed, along with the signal on line 162, into a multiplication circuit 180 having an output 182. The voltage slope coordinate appears in line 182 as a digital signal. In a like manner, the output 164 of table 160 is multiplied by the real time arc current at line 46b by multiplier 190 to produce a current slope coordinate in line 192. The values or signals in lines 182, 192 are added in a summation junction or circuit 196 to produce the static regulation term V$_{OUT}$ in line 200. Term V$_{OUT}$ is a fixed value, which value changes during each interrupt sampling of the current and voltage. Consequently, term V$_{OUT}$ varies according to the operating point of the DC welder.

Figure 8:
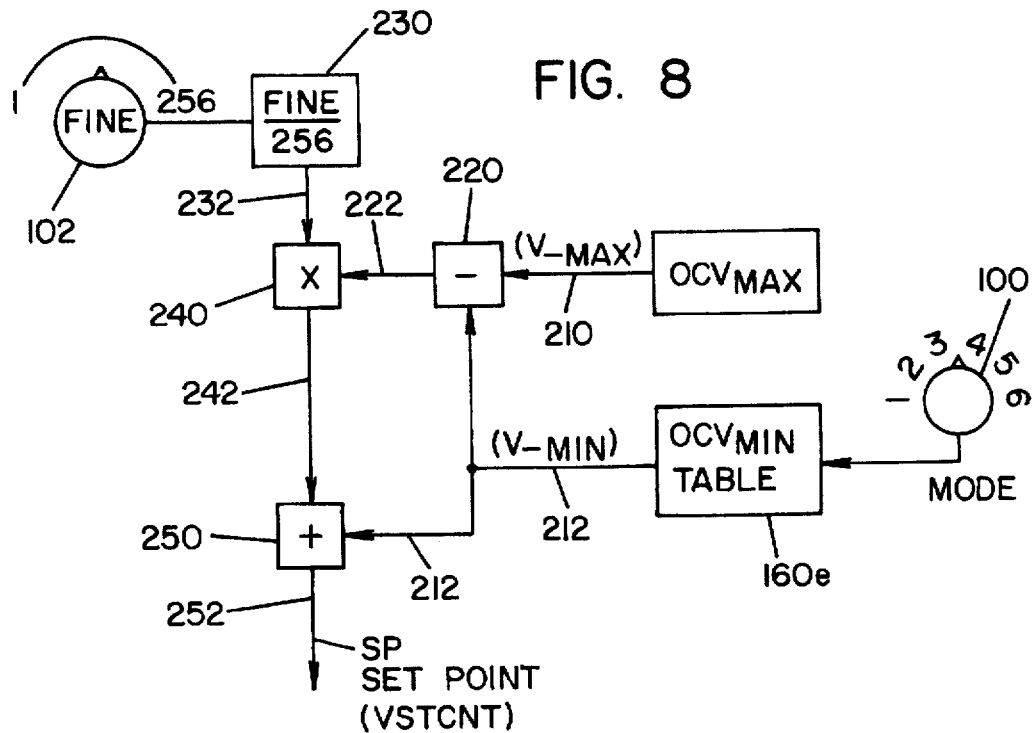
FIG. 8 is a block diagram illustrating the system and method for creating the set point current SP by the position of two switches or dials for comparison with the signal $V_{OUT}$ generated by the portion of the present invention illustrated in FIG. 7.
Figure 9:
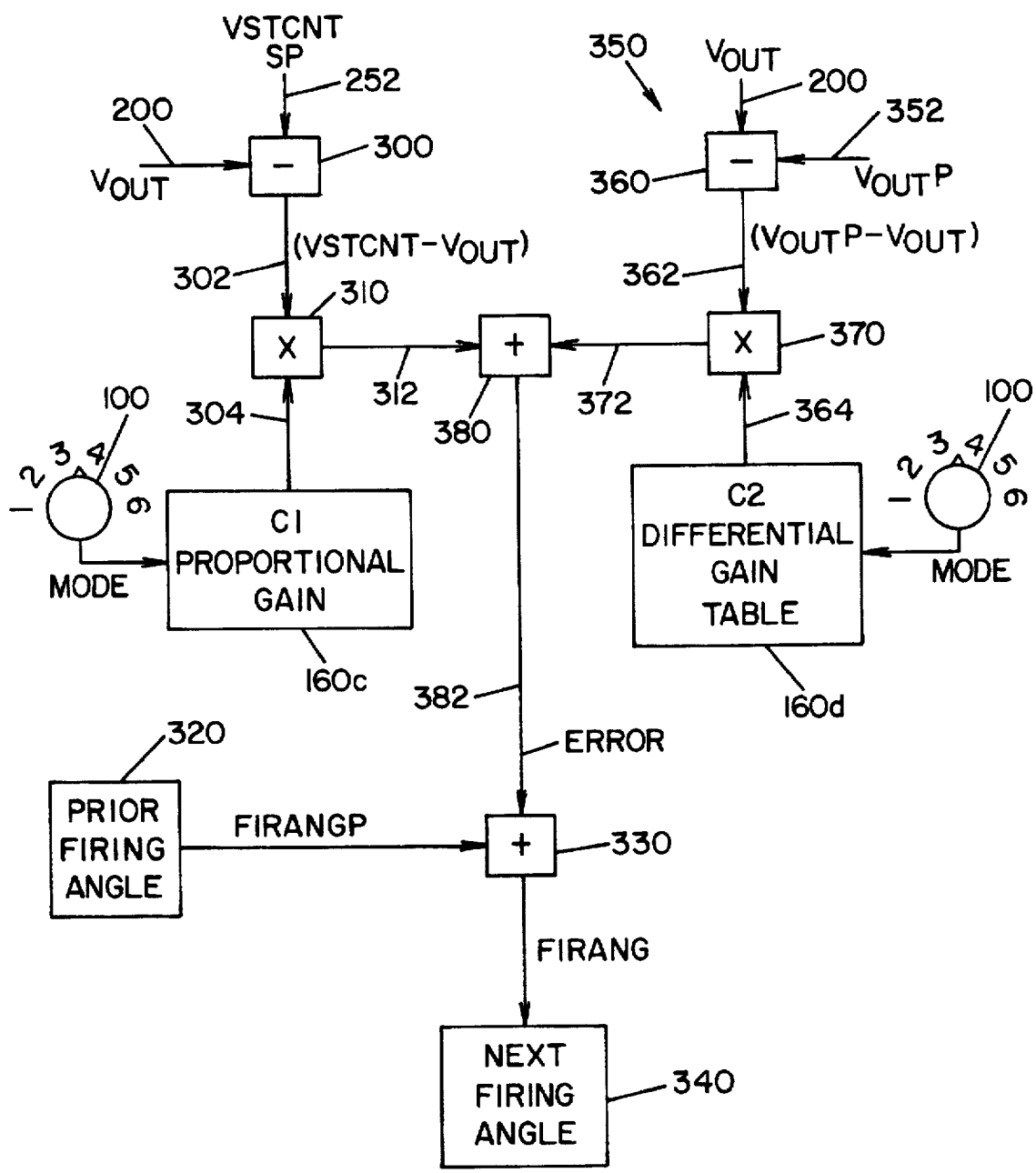
FIG. 9 is a block diagram illustrating the aspect of the method and system of the present invention wherein the set point SP, created by the portion of the invention illustrated in FIG. 8 is combined with the signal $V_{OUT}$ created by the portion of the invention illustrated in FIG. 8 is used to adjust the firing angles or firing times of the SCRs in the output rectifier of the engine driven DC welder illustrated in FIGS. 1 and 2; and, FIG. 10 is a graph as shown in FIG. 3 showing a slight modification of the preferred embodiment.

Referring now to the portion of the circuitry or routine for generating the target or fixed line of the output characteristic curve, FIG. 8 shows the circuitry used to create a fixed set point SP used to control the output of welder A. An electrical signal in line 210 has a fixed value representing the maximum open circuit voltage for welder A. In the preferred embodiment, this voltage is a feature of the welder. The signals in the illustrated embodiment of the invention may be digital or analog and may be a software generated number. Table 160 has an area 160e which stores values that are selected by movement of mode select switch 100 to produce a different minimum voltage signal for each select mode. The minimum voltage is a value which defines the maximum range of adjustment of potentiometer 102 to control the final y intercept of the actual curve 140. In accordance with the preferred embodiment of the invention, the signal on lines 210 and 212, or the software values, are subtracted in circuit or subroutine 220 to produce the voltage difference value or signal in line 222. The fine adjusting pot 102 controls the output of circuit 230 so that the fine adjustment value appears in output line 232. The value in line 232 is multiplied by the difference between the maximum and minimum voltage in circuit 240. The output 242 of multiplication circuit or routine 240 is essentially the vertical position between the maximum voltage and minimum voltage as selected by the fine adjustment at fine control pot 102. This concept is best illustrated in FIG. 5. To create the set point value, a selection by fine control pot 102 and a selection by the mode select switch 100 are employed. Output 242 is a signal having a value indicative of the adjusted position between the maximum and minimum voltage, as determined by the position of fine control pot 102. Line 212 carries a signal with a value indicative of the actual setting of the mode select switch 100. Signals obtained by the two manually controlled switches and appearing in lines 212, 242 are combined in summation junction circuit or routine 250 to produce a set point signal SP in line 252. Set point signal SP corresponds to the y intercept of the desired curve when considering the slope constant K1. In similar fashion the signal V$_{OUT}$ in line 200 relates to the y intercept of a curve with a slope set by constants K1, K2 and containing the present welding operation point. In other words, values on lines 200, 252 determine the vertical position desired by the control system or method and the actual vertical position of the operating point being employed by the welder at any given time. In accordance with the invention, these two values are to be brought together by changing the firing angles of the SCRs 31, 32 and 33. To accomplish this operation, a variety of circuits, routines or other implementation procedures could be employed. In accordance with the present invention, the two values in lines 200, 252 are employed for controlling the SCR firing angles by the circuit illustrated in FIG. 9. In accordance with the illustrated embodiment of the present invention, the fixed set point or target line SP is the value contained on line 252. The actual position or operating point for the welder is represented by the signal on line 200. To determine the amount of error between the desired position and the actual position, there is provided a comparison network, circuit or routine 300 having an output on line 302. The level of the signal on line 302 is indicative of the difference between the desired and actual operating point of the welder along the selected parallel line 140. In practice, this signal could be used for setting the next firing angle of the SCRs. In accordance with the illustrated embodiment of the invention, this error signal is modified by the circuitry illustrated in FIG. 9. A proportional gain constant C1 is outputted from area 160c of table 160 as shown in FIG. 6. The value of constant C1, i.e. m, appears on line 304. This value m is a gain factor which will trim the error signal in line 302. To accomplish this objective, gain C1 is multiplied by the actual error in line 302 by circuit 310 to produce a gain modified error signal in line 312. The next prior firing angles scheme stored in the control circuit memory at position 320 could be incremented or decremented by the value in line 312 to determine the next firing angles for the SCRs. This would be done periodically as the sampling interrupt of the program is executed in accordance with FIGS. 7, 8 and 9. The incrementing or decrementing is performed by the summing junction 330. This operation would produce new firing angles to be stored as the next firing scheme in area 340 of the microprocessor memory. The firing sequence using the new scheme would then be implemented.

In accordance with another aspect of the preferred embodiment, differential trimming network 350 modifies the error signal in line 312. This network prevents hunting and drastic corrective action being taken by the control circuit employing the present invention. Network 350 views the prior value of the regulation term on line 200. This signal or value is contained on input line 352 and is subtracted from $V_{OUT}$ on line 200 by network 360. The difference between the present value on line 200 and the prior value on line 352 appears on line 362. This signal or value shows the magnitude of difference between the prior operating point and the present operating point. A gain control constant C2 from area 160d of table 160 is outputted by mode select switch 100 onto line 364. The difference of operating positions appearing in line 362 is multiplied by circuit 370 with the value of gain factor C2 in line 364 to produce a different signal in line 372. This signal is added to the error signal in line 312 by summing junction or circuit 380 to produce a final ERROR signal in line 382. This ERROR signal is both modulated by proportional differences between the set point SP and the actual point $V_{OUT}$ and the amount of change from one cycle to the other so that the signal in line 382 produces a structured change in the firing angles to prevent erratic performance of the control system and/or method. The signal in line 382 decrements or increments the actual firing angles stored in area 320 to produce new stored firing angles or values in line 340. In this manner, the output of the engine driven welder A, as shown in FIGS. 1 and 2, is maintained along a selected, fixed slope characteristic curve as illustrated in FIG. 3.

A slight modification of the preferred embodiment of the present invention is illustrated in FIG. 10. MODE 1 is similar to MODE 2 shown in FIG. 3. The assumed nominal operation point, no, on line 400 has a voltage coordinate $V_{no}$ and a current coordinate $i_{no}$. The y intercept, corresponding to $V_{OUT}/K1$, is $V_{no}/K1$. In this embodiment the maximum voltage $V_6$ for MODE 6 is shifted below the actual maximum voltage $V_1$ of the welder.

Having thus defined the invention, the following is claimed:

1. A method of controlling the output current/voltage characteristic curve of an engine driven welder with a maximum open circuit output voltage, including a rotary engine, a three phase alternator, rectifier bridge having a number of electronic switching means for directing current to said output determined by the firing angle of said switching means during an appropriate half cycle, means for sensing output current, means for sensing output voltage, and a microprocessor output control device for controlling said firing angles of said switching means in response to the sensed current and sensed voltage, said method comprises the steps of:

(a) manually selecting one of several modes of operation, each of which has a preselected output characteristic curve with a fixed slope;

(b) causing said selection of said mode to create a first and second slope parameter with said parameters for a given mode being indicative of a known, fixed slope for said current/voltage characteristic output curve, said fixed slope defined by said first and second parameters corresponding to said selected mode;

(c) periodically generating a voltage value indicative of the real time sensed output voltage;

(d) combining said voltage value with said first slope parameter to give a voltage slope coordinate;

(e) periodically generating a current value indicative of the real time sensed output current;

(f) combining said current value with said second slope parameter to give a current slope coordinate;

(g) adding said voltage slope coordinate and said current slope coordinate to create a regulation term indicative of the present operating point of the welder;

(h) creating a desired set point for said regulation term, said set point being on a desired, target parallel characteristic curve having said fixed slope and manually adjusted to a line having an open circuit voltage less than said maximum open circuit voltage of said welder;

(i) creating an error signal by subtracting said set point and said regulation term; and, (j) changing the firing angle of said switching means in response to the magnitude of said error signal to force said regulation term toward said set point.

2. The method as defined in claim 1 including the additional step of:

(k) increasing the magnitude of said error signal in accordance with the difference between the current regulation term and a prior regulation term.

3. The method defined in claim 2 wherein said changing step includes the steps of:

(k) sensing the previous firing angles; and, (l) incrementing the firing angles in accordance with the magnitude of said error signal.

4. The method of claim 2 wherein said switching means are SCRs.

5. The method as defined in claim 1 wherein said manual adjustment is by a switching device having many adjusted positions for said parallel, target characteristic curve.

6. The method defined in claim 1 wherein said changing step includes the steps of:

(k) sensing the previous firing angles; and, (l) incrementing the firing angles in accordance with the magnitude of said error signal.

7. The method of claim 6 wherein said switching means are SCRs.

8. The method of claim 1 wherein said switching means are SCRs.

9. A system for controlling the output current/voltage characteristic curve of an engine driven welder with a maximum open circuit output voltage, said welder including a rotary engine, a three phase alternator, rectifier bridge having a number of electronic switching means for directing current to said output determined by the firing angle of said switching means during an appropriate half cycle, means for sensing output current, means for sensing output voltage, and a microprocessor output control device for controlling said firing angles of said switching means in response to the sensed current and sensed voltage, said system comprises: means for manually selecting one of several modes of operation, each of which has a preselected output characteristic curve with a fixed slope; means for causing said selection of said mode to create a first and second slope parameter with said parameters for a given mode being indicative of a known, fixed slope for said current/voltage characteristic output curve, said fixed slope defined by said first and second parameters corresponding to said selected mode; means for periodically generating a voltage value indicative of the real time sensed output voltage; means for combining said voltage value with said first slope parameter to give a voltage slope coordinate; means for periodically generating current value indicative of the real time sensed output current; means for combining said current value with said second slope parameter to give a current slope coordinate; means for adding said voltage slope coordinate and said current slope coordinate to create a regulation term indicative of the present operating point of the welder; means for creating a desired set point for said regulation term, said set point being on a parallel, desired, target characteristic curve having said fixed slope and manually adjusted to a line having an open circuit voltage less than said maximum open circuit voltage of said welder; means for creating an error signal by subtracting said set point and said regulation term; and, means for changing the firing angle of said switching means in response to the magnitude of said error signal to force said regulation term toward said set point.

10. The system as defined in claim 9 wherein said angle changing means includes means for sensing the previous firing angles; and, means for incrementing the firing angle in accordance with the magnitude of said error signal.

11. The system as defined in claim 9 wherein said switching means are SCRs.

12. A method of controlling the output current/voltage characteristic curve of an engine driven welder with a maximum open circuit output voltage, including a rotary engine, a three phase alternator, rectifier bridge having a number of electronic switching means for directing current to said output determined by the firing angle of said switching means during an appropriate half cycle, means for sensing output current, means for sensing output voltage, and a microprocessor output control device for controlling said firing angles of said switching means in response to the sensed current and sensed voltage, said method comprises the steps of:

(a) creating a desired fixed slope operating current/voltage characteristic curve;

(b) sensing the present operating current/voltage point of said engine driven welder;

(c) creating a desired set point on said curve;

(d) comparing said present operating point and said desired set point to provide an error signal; and, (e) changing said firing angles of said switching means in response to said error signal to shift said present operating point to said desired set point on said created current/voltage curve.

13. A system of controlling the output current/voltage characteristic curve of an engine driven welder with a maximum open circuit output voltage, including a rotary engine, a three phase alternator, rectifier bridge having a number of electronic switching means for directing current to said output determined by the firing angle of said switching means during an appropriate half cycle, means for sensing output current, means for sensing output voltage, and a microprocessor output control device for controlling said firing angles of said switching means in response to the sensed current and sensed voltage, said system comprises: means for creating a desired fixed slope operating current/voltage characteristic curve; means for sensing the present operating current/voltage point of said engine driven welder; means for creating a desired set point on said curve; means for comparing said desired set point and said present operating point and providing an error signal; and, means for changing said firing angles of said switching means in response to said error signal to shift said operating point to said desired set point on said created current/voltage curve.

14. A system as defined in claim 13 wherein said switch means are SCRs.

\* \* \* \* \*